United States Patent [19]

Shand et al.

[11] Patent Number: 5,134,610

[45] Date of Patent: Jul. 28, 1992

[54] NETWORK TRANSIT PREVENTION

[75] Inventors: I. Michael C. Shand, Cobham; John A. Harper, Reading; Kevin Miles, Reading, all of England

[73] Assignees: Digital Equipment Corporation, Maynard, Mass.; Board of Regents of the Unversity, Seattle, Wash.

[21] Appl. No.: 320,178

[22] Filed: Mar. 6, 1989

[30] Foreign Application Priority Data

Aug. 2, 1988 [GB] United Kingdom ............... 8818368

[51] Int. Cl.⁵ .............................................. H04J 3/24
[52] U.S. Cl. ..................................... 370/60; 370/94.1; 370/85.13
[58] Field of Search ....................... 370/94.1, 60, 94.3, 370/85.13, 85.14; 340/825.5, 825.51

[56] References Cited

U.S. PATENT DOCUMENTS

| 3,890,471 | 6/1975 | Hachenburg | 370/85.14 |
| 4,539,679 | 9/1985 | Bux et al. | 370/85.14 |
| 4,597,078 | 6/1986 | Kempf | 370/85.13 |
| 4,706,081 | 11/1987 | Hart et al. | 370/85.13 |
| 4,769,811 | 9/1988 | Eckburg et al. | 370/60 |
| 4,887,259 | 12/1989 | Morita | 370/60 |
| 4,939,726 | 7/1990 | Flammer et al. | 370/94.3 |

OTHER PUBLICATIONS

Estrin, Deborah, "Interconnection Protocols for Interorganization Networks", IEEE Journal on Selected Areas in Communications, vol. SAC-5, No. 9, Dec. 1987.
Estrin, Deborah and Tsudik, Gene, "Visa Scheme for Interorganization Network Security", IEEE, Publication CH2416-6/87/000/0174 at 174-182 (1987).
Estrin, Deborah, "Controls for Interorganization Networks", IEEE Transactions on Software Engineering, vol. SE-13, No. 2, at 249-261 (Feb. 1987).
Estrin, Deborah, "Inter-Organization Networks: Implications of Access Control Requirements for Interconnection Protocols" ACMO-89791-201-2/86/08-00-0254 at 254-264 (1986).
Estrin, Deborah, "Inter-Organizational Networks: Stringing Wires Across Administrative Boundaries", 0376-5075/85 (North-Holland 1985), Computer Networks and ISDN Systems 9 at 281-295.
Estrin, Deborah, "Non-Discretionary Controls for Inter-Organization Networks", IEEE Publication CH2150-1/85/0000/0056 at 56-61 (1985).
DECnet Digital Network Architecture (Phase V) General Description, (at 37-45) (Sep. 1987).
"Telecommunications and Information Exchange Betweeen Systems," ISO/TC47/506 at 12-18 (New York 1987) (Subsequently ISO Standard 8473).
"Connectionless Mode Transmission," ISO/DIS 8348/0607 at 12 (New York 1986).

Primary Examiner—Douglas W. Olms
Assistant Examiner—H. Kizou
Attorney, Agent, or Firm—Cesari & McKenna; Christensen, O'Connor, Johnson & Kindness

[57] ABSTRACT

In a digital communications network, data packets are prevented from making a transit through a domain if such data packets neither originate within nor are addressed to a node within that domain. Only data packets flagged as originating within the domain are allowed to be forwarded out of the domain.

12 Claims, 7 Drawing Sheets

| 1100 0101 | SECURITY PARAMETER CODE |
|---|---|
| 0000 0010 | LENGTH |
| 0100 0000 | SOURCE SPECIFIC |
| 0000 0001 | INTERNAL |

FIG. 6

| 1100 1100 | PADDING PARAMETER CODE |
|---|---|
| 0000 0010 | LENGTH |
| 0000 0000 | PADDING OCTET 1 |
| 0000 0000 | PADDING OCTET 2 |

FIG. 7

| 1100 0101 | SECURITY PARAMETER CODE |
|---|---|
| 0000 0010 | LENGTH |
| 0100 0000 | SOURCE SPECIFIC |
| 0000 0001 | INTERNAL |
| 1100 1100 | PADDING PARAMETER CODE |
| n | LENGTH |
| 0000 0000 | PADDING OCTET 1 |
| ... | |
| 0000 0000 | PADDING OCTET n |

FIG. 8

| 1100 1100 | PADDING PARAMETER CODE |
|---|---|
| n + 4 | LENGTH |
| 0000 0000 | PADDING OCTET 1 |
| ... | |
| 0000 0000 | PADDING OCTET n+4 |

FIG. 9

NETWORK TRANSIT PREVENTION

FIELD OF THE INVENTION

This invention is generally related to the field of digital communications networks and, more specifically, to the field of interdomain routing of data packets in a "connectionless" mode. The invention provides a simple means for preventing "transit" of data packets through a domain if such data packets neither originate within nor are addressed to a node within that domain.

BACKGROUND OF THE INVENTION

It will be helpful in understanding the invention to refer to the background of digital communications networks, which in recent years have been expanded to link virtually boundless numbers of data processors or computers of different designs in different geographic locations, and owned or administered by different entities. FIG. 1 depicts an exemplary network, wherein the circular "nodes" (11, 12, 13, etc.) include processor sites, and the lines connecting them (111, 112, 121, etc.) are physical transmission media or "circuits" by which the nodes communicate, by wire, by microwave (wireless), optically, or otherwise, including combinations of media. It is to be understood that this diagram is in "connection space"; that is, it depicts data connection relationships and not geographic relationships. For example, nodes 13 and 14 may be in the same room, while node 15 may be miles or thousands of miles away.

To establish standards for, and thereby facilitate communications between, nodes of different processor design and application, the International Organization for Standardization ("ISO") has set forth its "Open Systems Interconnection" ("OSI") Reference Model (ISO 7498), which defines seven functional levels or "layers" of communication in nodes communicating under OSI.

FIG. 2 depicts the layers and data flow in the OSI Reference Model for a hypothetical network segment. The Physical Layer 207 includes the functions necessary for transmission and reception of data on the transmission or physical medium 208, involving, for example, the conversion of digital data signals to and from the signal format used in the medium 208. The Data Link Layer 206 includes functions for facilitating communications between directly connected nodes in a network; these functions are not of particular interest here. The Network Layer 205, to which the present invention primarily relates, routes user data between nodes in the network. A "router" 209 comprises the functions of layers 205 through 207, to the extent the functions of such layers are implemented. A physical implementation of a router may perform only those functions, as depicted in node 23, or may be the portion (e.g., routers 211, 221 and 241) of a "full service" processor (e.g., nodes 21, 22, and 24) which performs the router functions, among other functions.

With further reference to FIG. 2, the Transport Layer 204 provides end-to-end services between communicating nodes, such as requesting confirmation of receipt of transmissions, transmissions of such confirmations, and retransmissions if no such confirmations are received. The higher levels, i.e., the Session, Presentation, and Application Layers (203, 202 and 201, respectively) support standardized application protocols which are not the subject of this disclosure.

Data stream 20 in FIG. 2 is exemplary of how information is transferred in the OSI Reference Model, in this case, from a user at node 21 to a user at node 24, by way of intermediate nodes 22 and 23. Routing decisions in the nodes are made at the Network Layer 205 in general accordance with routing strategies known in the art such as "shortest path," "best efforts," "least expensive" and the like, programmed or hard-wired into processors or circuits associated with the Network Layer 205. The routing decisions generally require an identification of the destination (intermediate or ultimate) for information received on physical medium 208 (corresponding to a "circuit"), an identification which may be carried along in the data stream. Other information may also be used (which may also be carried in the data stream), such as quality of service requested, which may determine which of alternative forwarding paths to use.

Network data communications, in contrast to voice communications, often are made in a "connectionless" mode. In that mode, "data packets" or "datagrams" of contiguous signals led by identifying "header" signals (and possibly terminated with identifying "trailer" signals) are routed from node to node between end users (e.g., node 21 to node 22 to node 23 to node 24 in FIG. 2) without "connection" in the sense of dedication of the entire end-to-end transmission path at any instant to the transmission. There is no connection at the Network Layer 205, and router 221, for example, having made a decision to forward a datagram to node 23, never "knows" (or "cares") if that datagram reaches nodes 23 or 24.

In OSI connectionless network service, a "virtual connection" 34—34 is nonetheless made at the Transport Layer 204. This is a connection in the sense that while there is no physical connection at any one time, communication is established between nodes 21 and 24 at Transport Layer 204 and above without reference to how data is communicated at the Network Layer 205 and below. That is, insofar as the layers 204 and up are concerned, there is a direct connection between nodes 21 and 24. The connection 34-34 is made at the Transport Layer 204 in OSI connectionless mode service when a datagram carrying a request for connection reaches node 24, that datagram is interpreted at the Transport Layer of node 24 as a request for connection, node 24 responds with a datagram confirming connection sent to node 21, and the Transport Layer of node 21 recognizes the confirmation.

To allow standardization at each layer, OSI defines protocols for or structures of data recognized at the respective layers. These structures are known as Protocol Data Units ("PDUs"). FIG. 3 depicts general PDU data structures for each layer. As suggested in FIG. 3, the PDUs are "nested" in the sense that each PDU includes the "client" PDU for the next higher or "client" layer, along with a "service header." A service header provides "protocol control information" relevant to its particular layer. For example, the "Network Service Header" 305 may include destination and quality of service information for Network Layer (routing) decisions.

Referring to FIGS. 2 and 3 in conjunction, user information to be communicated starts as an application data unit 31 and is prepared for transmission on the physical medium 208 (descending through the OSI layers 201 through 207) at originating node 21 by sequentially adding service headers 302 through 307. These headers provide information for servicing of the datagram that is interpreted and acted upon by the appropriate functional layer in subsequent nodes through which the datagram is routed, nodes 22, 23, and 24 in the example. At the terminating node 24, the headers are generally stripped away in sequence in ascent through the OSI layers.

Of particular interest here, and as an example of layer communications, the "Network Protocol Data Unit" ("NPDU") 35 (FIGS. 2 and 3) includes protocol control information in the Network Service Header 305 (FIG. 3). Referring to FIG. 2, when NPDU 35 reaches the network layer of router 221 in node 21, the Network Service Header is interpreted by the network layer processor and forwarded according to its routing program on a circuit to the next node, node 23 in this example. Router 221 may alter the service header to include different protocol control information for use by router 23, resulting in a modified NPDU 35' at the Network Layer. Router 23 in turn may generate a modified NPDU 35" to be serviced by router 241 at the Network Layer, which in the example terminates the transmission of the datagram since node 24, containing router 241, is the end user node. Thus, at the Network Layer 205, what is communicated is the NPDU, and, because of the focus on routing rather than physical connections in network analysis, "data packet" is often treated as synonymous with "NPDU."

While many networks are operated under a single administration, it is common today to have networks owned or operated by different administrations connected to form larger networks. Within such a multi-administration network, the subset of nodes and circuits belonging to a particular administration is here called a "domain." Such a domain is here assumed to be topologically "continuous" in connection space in that every node that is a member of the domain may be connected to every other node in the domain using only nodes and circuits entirely within the domain. In FIG. 1, such a domain 10 is enclosed within domain boundary 110. Again, nodes 13 and 14 may be in the same building, but in different domains (node 13 being "external" to domain 10 and node 14 being "internal"), while nodes 14 and 15, both internal to domain 10 may be separated by many miles.

Although interdomain communication is one of the goals of OSI, there are occasions in which there is a need to prevent the mere "transit" (e.g., data path 100 in FIG. 1) through a domain of data packets which neither originate within nor are addressed to a node within that domain. Without controls, it is possible for "traffic" or data (e.g., originating at external node II) to enter a given "local" domain (e.g., domain 10) at one point (e.g., node 14) and pass through the domain on its way to an external destination (e.g., node 19), making use of the resources of the local domain, such as routers (e.g., routers at nodes 14 through 18), communications channels (e.g., in circuits 142, 151, etc.), and the like.

Such transit merely uses the resources of the local domain without "substantively" communicating with the domain. In the terminology of the OSI Reference Model, such transit uses the lower or network layer communications resources of the domain without communications at the higher or user layers. It may result in denial of resources to traffic involving user communications between local nodes. It may also result in tariffs charged to the local domain administration in those cases where the local domain uses public network links, e.g., telephone company circuits, with tariffs proportional to the traffic carried. It may also make the domain a "common carrier" in violation of local laws.

Thus, it is the goal of the invention to permit communication through a domain only where one or both of the parties to the communication is a member of the domain, while preventing communication through the domain where neither party is a member of the domain.

A "visa scheme" of access control protocol for implementation within OSI has been suggested by D. Estrin, "Interconnection Protocols for Interorganization Networks," IEEE Journal on Selected Areas in Communications, Vol. SAC-5, No. 9, December 1987. In that scheme, depicted in FIG. 1A, at each point or "gateway" of entry into or exit from a domain 120 (gateways 102 and 107, respectively), a data packet or NPDU seeking entry or exit will be rejected unless it carries a valid "visa" authorizing such entry or exit. The visa is initially obtained from an access control server 106 on the basis of the identity of the source and destination of the NPDU.

The Estrin visa scheme can be used to implement a blanket prevention of transit by preventing entry into the domain of any NPDU which does not have a destination within the domain. However, that scheme, in its fully implemented form with time limits on visas, relies upon relatively frequent updates of visa information at the gateways, thus calling for operation considerably more complex than required by the present invention.

Even if it were only selectively implemented and tailored to transit prevention, the Estrin visa approach suffers from the same disadvantage as other approaches of rejecting transit traffic at the point of entry into the local domain. The disadvantage is the requirement of knowledge, at each point of entry, of which destinations are members of the local domain. Such knowledge would require the maintenance of a complete list of domain members at each point of entry (by updating from the access control server) or provision of distributed access to a common list, plus comparison of the destinations of entering data packets with the list. This resource drain would be exacerbated in the context of existing domains which contain hundreds and even thousands of nodes, with commensurate numbers of intended entry points and with additional potential entry points at the connections to common carriers.

Knowledge of the domain membership status of the destination of incoming data packets might also be provided in the destination node addresses by assignment of codes to member nodes indicating their domain membership. For example, the same prefix may be given to the node addresses for each node that is a member of the domain, so that only traffic destined for node addresses with that prefix are allowed to enter the domain. However, given the large number of nodes now typical of many domains, the multiple addresses carried by many nodes, and the frequent subdivisions and additions to such domains, the address code approach is not believed to be manageable because it would require reservation of such codes for present and future domains, the number and size of which are not predictable. There may be other constraints on node addresses that would interfere with such a scheme.

SUMMARY OF THE INVENTION

In summary, the invention provides a simple means for preventing transit of data packets through a domain by allowing data packets which enter the domain on circuits designated "external" by the domain administrator to be routed within the domain unchanged, but deleting such packets at any node or router at which forwarding over an external circuit is attempted. Each data packet originating within the domain is flagged with an "internally originated" code at origination, and it carries that code until it is either received at its terminal destination within the domain or forwarded over an external circuit, at which time the "internally originated" code is removed.

Unlike the Estrin visa and other point of entry suppression schemes, maintenance or accessing of, and comparison with, tables of hundreds of domain members at perhaps hundreds of entry points is not required by the invention. In contrast to those prior schemes, very little more information is required at any given node in the domain than the routing information that node would normally receive and process: the invention does not require a given node to "know" anything about any other node. Nodes at the domain boundary need only store the designation of the circuits connected to it as "external" or not and have the capabilities of detecting on which kind of circuit a given data packet was received and whether that packet was flagged as "internally originated." Only when a circuit at a domain member node is newly connected to or removed from direct communication with a node outside the domain is domain administrative action required, and then only at the member node connected to that circuit.

Although the invention allows some use of a domain's resources by data packets which are ultimately deleted as externally originated and destined, but make their way to the exit point of the domain before being deleted, that semi-transmitting use, in most "connectionless" mode services such as that offered under OSI, is limited to initial, and possibly retransmitted, requests for end-to-end connection 34 (FIG. 2) at the Transport Layer 204. The routers, being at the Network Layer and below, have no "knowledge" of the failure of a given data packet to reach its destination, and any retransmission initiated at the Transport Layer or above, except in exceptional circumstances, would be routed over the same data path. In the present invention, that data path ends for any externally originated request for connection data packet (as well as any other externally originated traffic) at the node at which exit from the domain is attempted, if not rejected for other reasons at the point of entry. Because these connection requests do not reach their destination, no confirmations are returned. Thus, no Transport Layer connections are made, and no communications established using transit routing through the domain.

A Transport Layer or higher layer decision might be made to try a different routing strategy, typically using an alternative destination node address. Such action still would not succeed in establishing Transport Layer connection if either connection request or confirmation data packets were routed in an attempt to transit a domain in which the invention is implemented.

Thus, the present invention, while allowing some partial transit at the Network Layer, prevents full transit at that layer and prevents connection at the Transport Layer. Because, as a general matter, communications following Transport Layer connection use far more network resources than the request for connection and any retransmissions of that request, the invention effectively solves the problem of transit use of local domain resources in a simple and efficient manner compared to the prior art.

BRIEF DESCRIPTION OF THE DRAWINGS

In order that the invention may be more clearly understood, reference is made to the accompanying drawings which show the preferred embodiment and details of its operation:

FIG. 6 depicts the data structure of the "internally originated" code while the NPDU is within its originating domain as implemented using the security option of ISO 8473;

FIG. 7 depicts the data structure of the "internally originated" code after replacement when the NPDU is forwarded out of its originating domain as implemented using the security option of ISO 8473;

FIG. 8 depicts the data structure of the "internally originated" code while the NPDU is within its originating domain as implemented using the security option of ISO 8473 where the padding option is used; and FIG. 9 depicts the data structure of the "internally originated" code after replacement when the NPDU is forwarded out of its originating domain as implemented using the security option of ISO 8473 where the padding option is used.

DETAILED DESCRIPTION OF AN ILLUSTRATIVE EMBODIMENT

Figure 1:
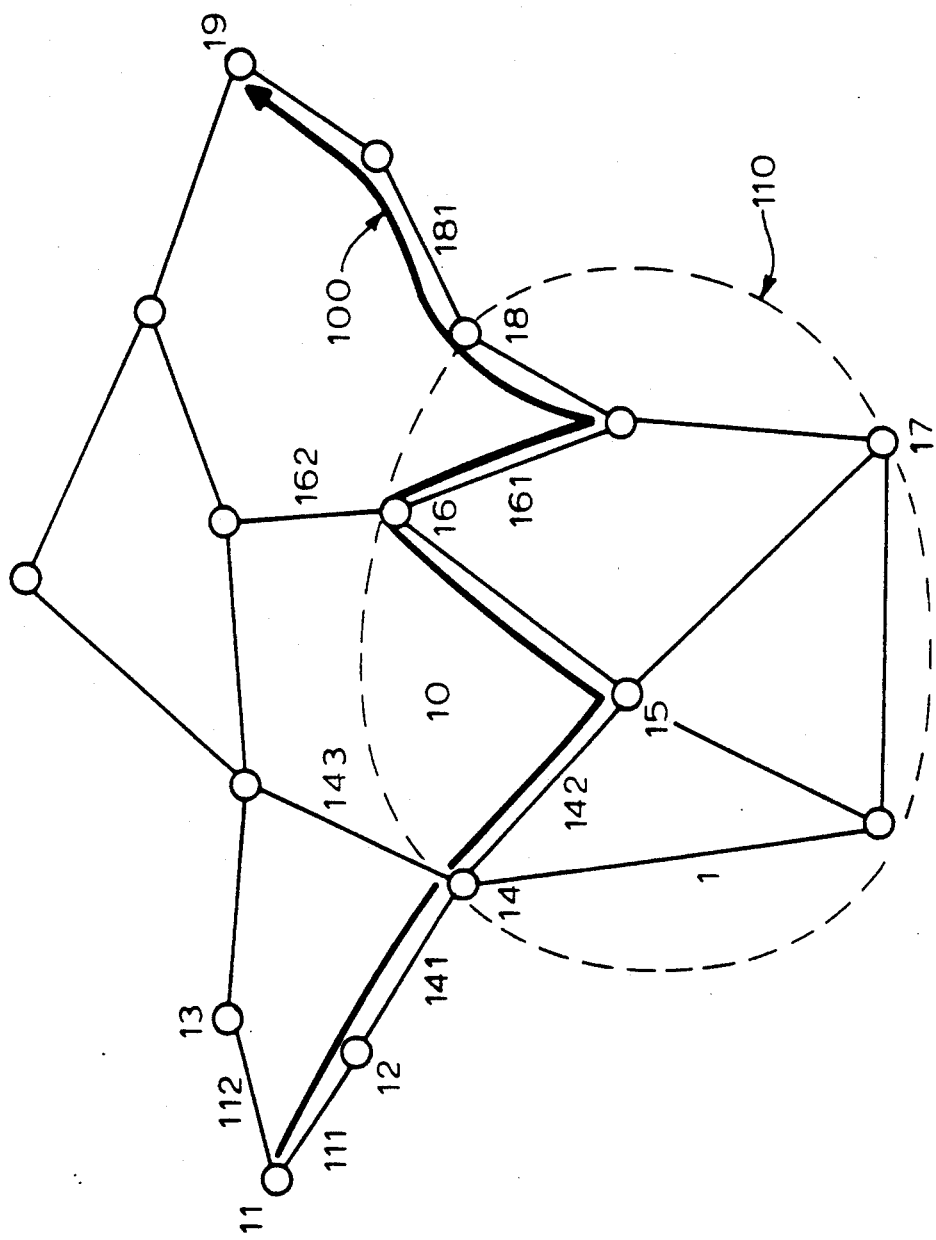
FIG. 1 depicts a network in a transit situation.
Figure 1A:
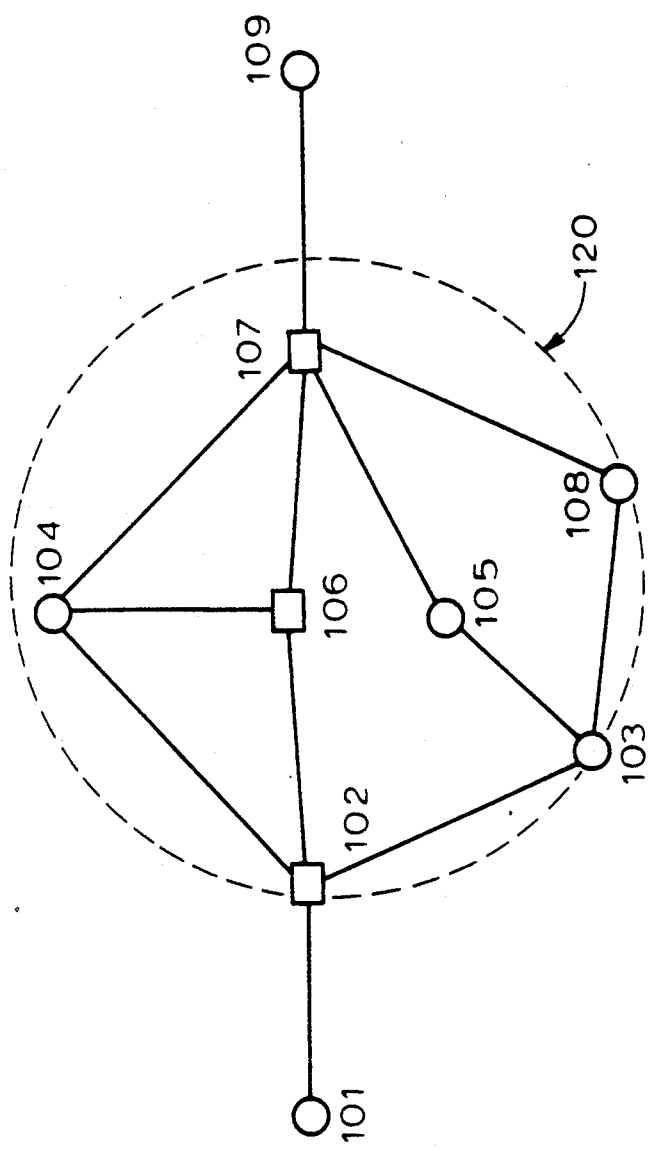
FIG. 1A depicts a prior art configuration for network domain across control.

Referring to FIG. 1 as an illustrative example, transit along data path 100 through domain 10 is prevented at an exemplary node 18 when forwarding is attempted over external circuit 181. Traffic originating on an external circuit, for example, circuit 141, is allowed to enter domain 11 and to terminate, for example, at node 17. Also, any traffic originating within domain 10, for example, at node 17, is allowed to exit, for example, at node 18 over external circuit 181. However, traffic originating on an external circuit, for example, circuit 141, is deleted when an attempt is made to forward it on an external circuit, for example, at node 18 when forwarding is attempted on circuit 181.

Figure 4:
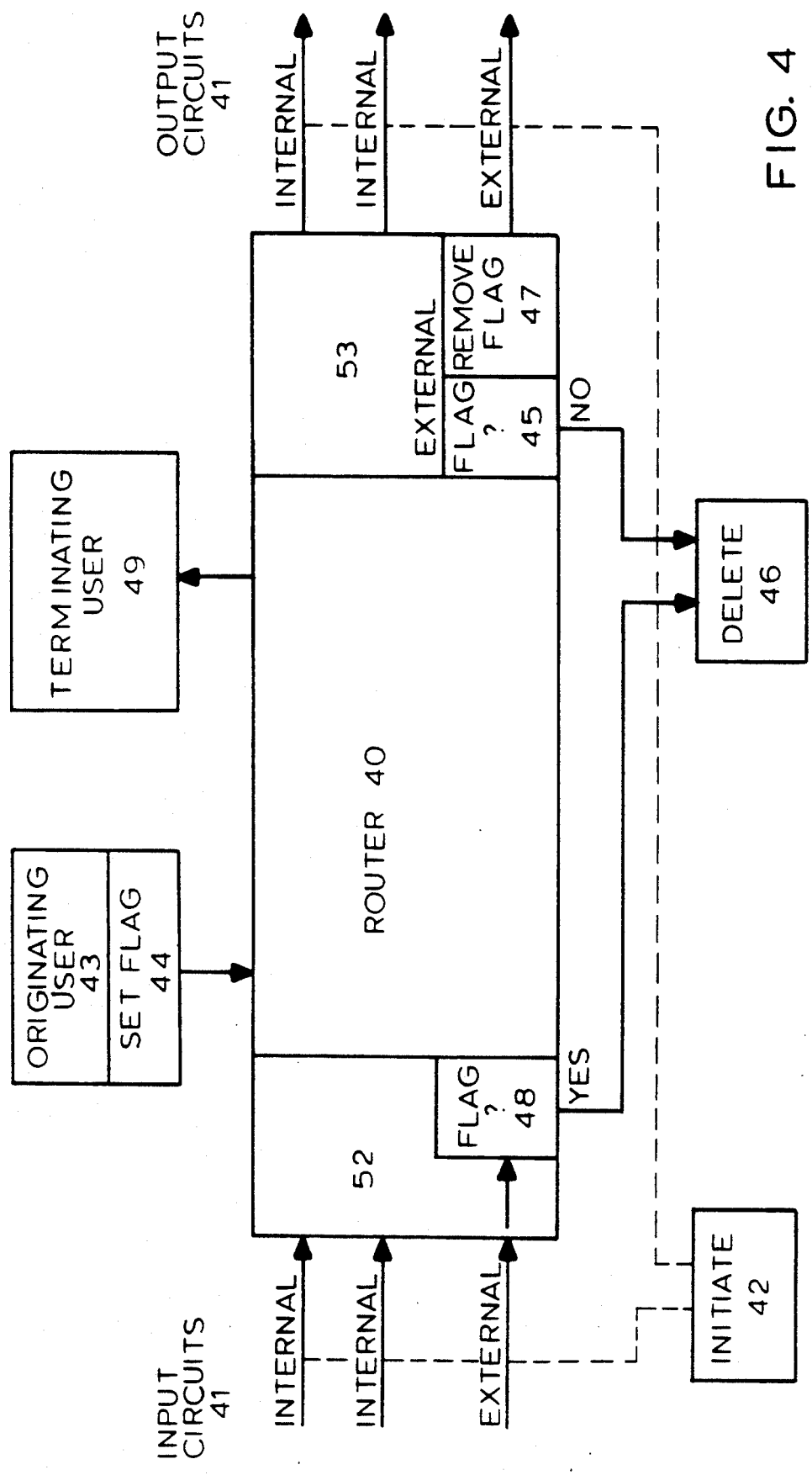
FIG. 4 depicts data flow at a router according to the invention.
Figure 5:
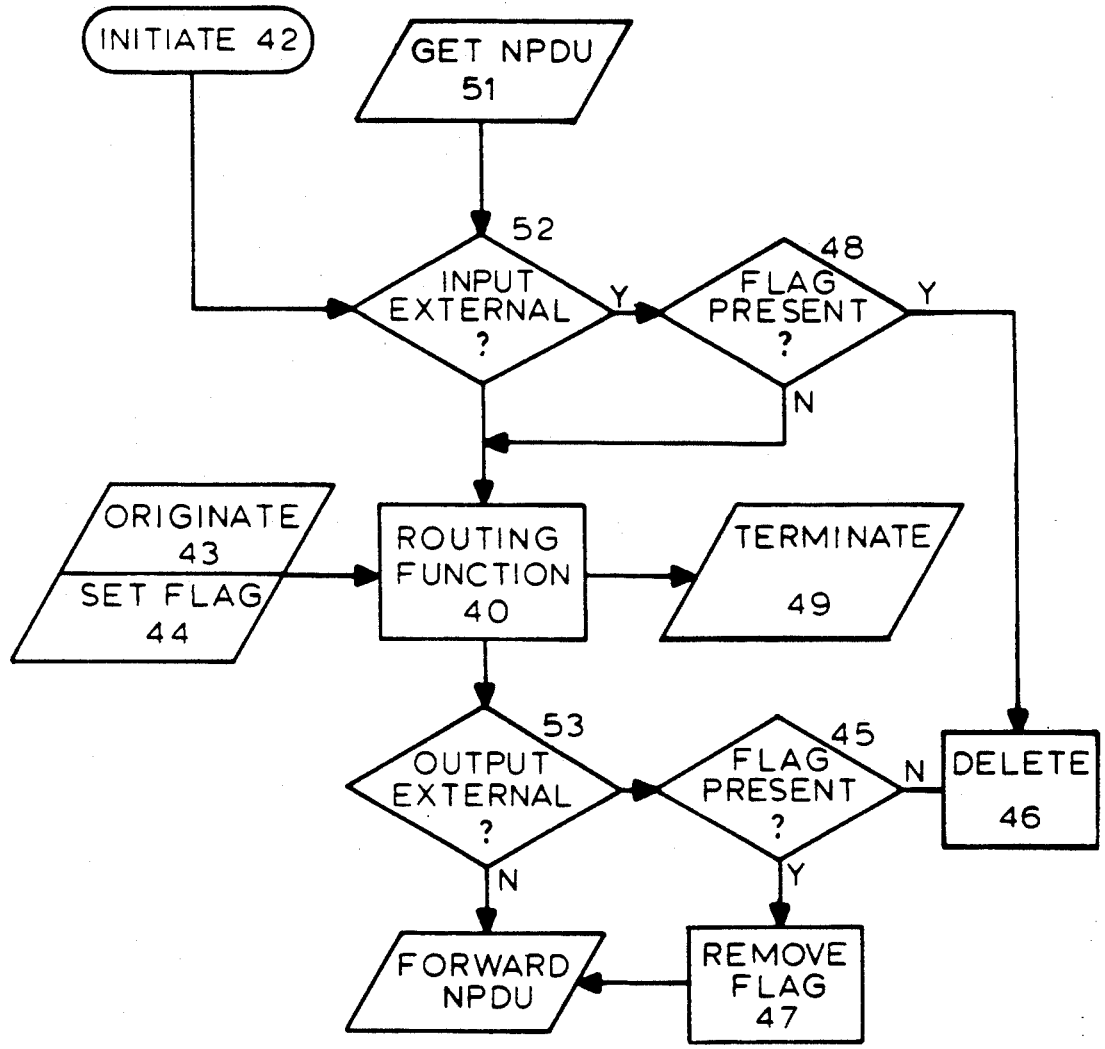
FIG. 5 depicts the decision at a router according to the invention.

FIG. 4 shows an exemplary router 40 used in a network domain in which the invention is implemented, further showing the logical components and data flow involved in the implementation. Only if router 40 has at least one external circuit connected to it, and is thus a "boundary router," is it necessary that all the functions be implemented as shown. All that is required by the invention for a domain member router that has no external circuits is that any data packet originating at 43 at the node of which the router is a part be flagged at 44 with an "internally originated" code. Pure router nodes in which no data transfer occurs above the Network Layer require no change from their ordinary function. FIG. 5 shows the router decision flow for a general or boundary router, with steps keyed to FIG. 4. It should be understood that the router functions shown in FIGS.

4 and 5 may be programmed in software or hard-wired by those skilled in the art.

Referring to FIG. 4, in initialization, each circuit 41 attached to a local domain router 40 can be designated by the network administrator 42 to be either "external" or, by lack of designation, "internal." A circuit is designated "external" according to the invention if it connects directly to nodes outside the local domain and is considered "internal" if it connects directly only to nodes within the local domain (including boundary nodes). Thus, in the example of FIG. 1, circuits 141, 143, 162, and 181 are designated "external." This designation, as well as the subsequent determinations at means 52 whether a data packet arrived on an external circuit and at means 53 whether a data packet is sought to be forwarded over an external circuit, can be accomplished by means well known to communications engineers, including software switches and jumpers.

Also referring to FIG. 4, any data packet originating at originating user 43 within the local domain node associated with router 40 is flagged at means 44 (which may be part of the router) with an "internally originated" code. (Although it is not implemented in the illustrative embodiment, "internally originated" status could be the default status, and any data packet received on an "external" circuit flagged with an "externally originated" code.) Those data packets designated "internally originated" carry the designation until termination at terminating user 49 or exit from the local domain at means 47. A lack of an "internally originated" designation is similarly unchanged except that data units so designated are not allowed to exit from the local domain (see means 45 and 46 in FIGS. 4 and 5).

Figure 2:
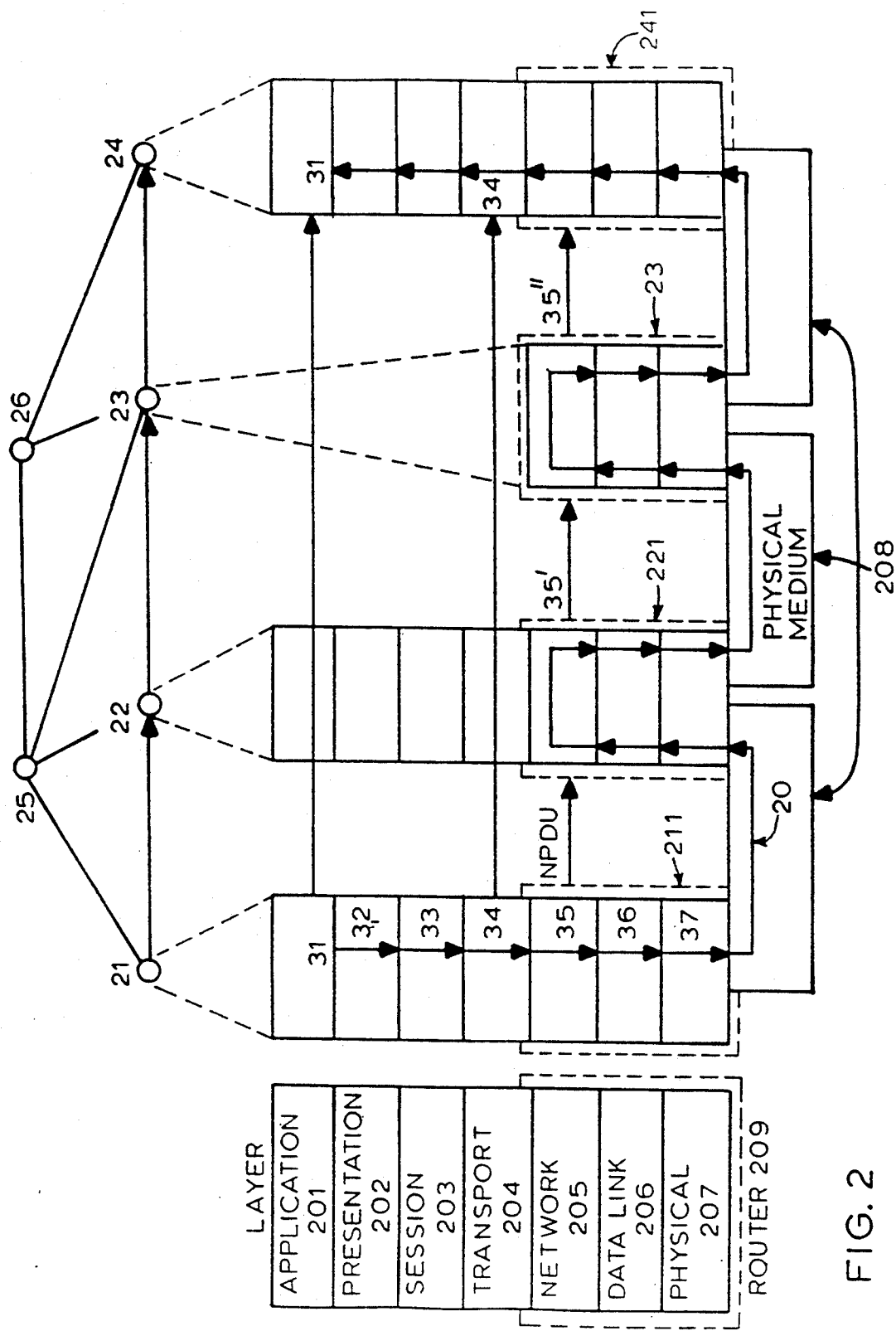
FIG. 2 depicts the layers of the OSI Reference Model.
Figure 3:
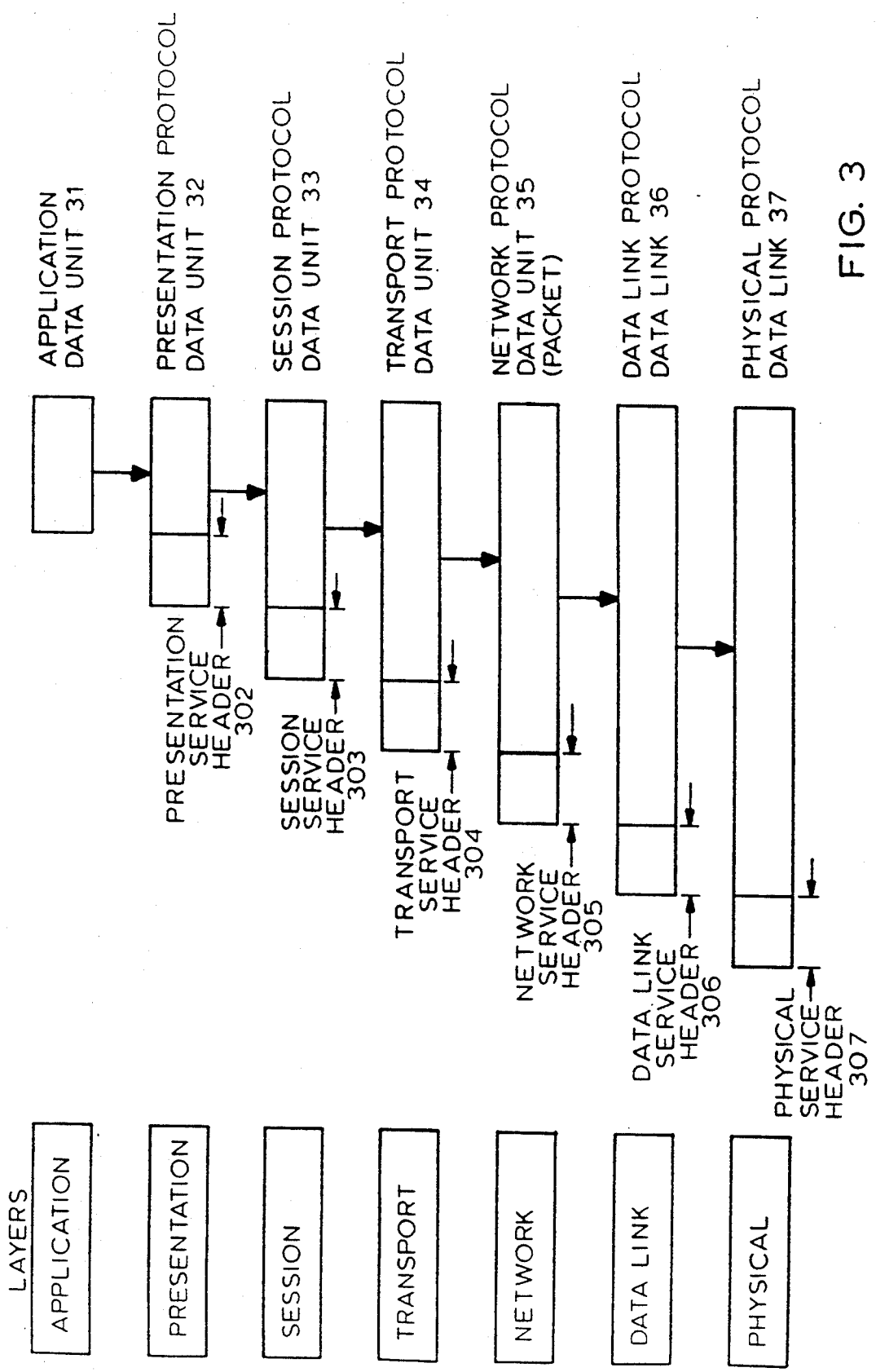
FIG. 3 depicts PDUs involved in OSI network formation.

In the illustrative embodiment, which applies the OSI Reference Model of FIGS. 2 and 3, the "internally originated" designation is included in the Network Service Header 305 for each NPDU. The ISO "Protocol for Providing the Connectionless-Mode Network Service" (ISO 8473) includes no field explicitly allocated to carry such "transit type" information. However, an option is provided to carry security information. Thus, in the illustrative embodiment, the "internally originated" type is encoded by the presence of a particular security code, FIG. 6, in Network Service Header 305, and "externally originated" by the absence of that code. In the illustrative embodiment, the security code used is a standard "source specific" code, which indicates that it has meaning for the source node, rather than for the destination node or for all nodes in the network.

Because the "internally originated" code will generally have no meaning outside the local domain and may, if present, cause a data packet to be rejected downstream, when an "internally originated" NPDU is to be transmitted over an external circuit, it is necessary to remove the "internally originated" code. It is not permitted by ISO 8473 to change the length of the Network Service Header, so that the removal of the "internally originated" flag is effected in the illustrative embodiment by converting at means 47 (FIGS. 4 and 5) the security option into an ISO 8473 padding option, FIG. 7. If a padding option is otherwise implemented, in the illustrative embodiment, it is implemented adjacent to the security option so that the "internally originated" code is shown in FIG. 8, and the existing padding option is extended at means 47 to replace the security option as shown in FIG. 9 when the "internally originated" code is removed for forwarding on an external circuit.

Similarly, an NPDU arriving over an external circuit must be rejected if it carries the "internally originated" flag, since it would have a different meaning in the external domain or be an attempt to masquerade as an "internally originated" NPDU in the instant domain. Accordingly, when an data packet arrives at a router 40 and it is determined at means 52 that it arrived on an external circuit, and it is further determined at means 48 (FIGS. 4 and 5) that packet has an entry in its security option, the packet is deleted at means 46 (FIGS. 4 and 5).

If an NPDU without an "internally originated" code is received by a router 40 and is not terminated at user 49 of that node, it will be forwarded only on an internal circuit. If, after the routing decision is made at router 40, it is determined at means 53 that forwarding is sought on an external circuit, the packet is deleted at means 46 (FIGS. 4 and 5). Thus, transit, for example, over data path 100, of a non-locally originated data packet is prevented.

The foregoing represents an illustrative embodiment of the invention. Other embodiments are possible, including, but not limited to, non-OSI protocols, "connection" mode service, and flagging of "externally originated" data packets. It is also possible to prevent forwarding data packets originating at subsets of domain member nodes to destinations outside the local domain, for example, by omitting from the illustrative embodiment the inclusion of an "internally originated" code at such nodes.

Having described this invention, what is claimed as new and secured by Letters Patent are:

1. A method of operating a digital including routers communicating by receiving and forwarding data packets over circuits, a topologically continuous of local domain of routers and circuits wherein each router may be connected with another router in the local domain using only circuits and routers in the local domain, and at least one circuit directly connecting a router in the local domain and a router outside the local domain, said method comprising the steps of:
   a. designating those circuits and only those circuits directly connecting any router within the local domain and any router outside that domain as external;
   b. flagging data packets originating at any node associated with a router within the local domain and only such packets with a code indicating internal origination;
   c. maintaining any code indicating internal origination or lack of such code constant through communications of any data packet within the local domain; and
   d. forwarding on those circuits designated external only data packets having an internal origination code.

2. The method of claim 1 further comprising the step of storing within a local domain router directly connected to any router outside the local domain the designations of the circuits attached to the local domain router and to a router outside the local domain as external.

3. The method of claim 1 further comprising the step of deleting any data packet received over an external circuit which contains an internal origination flag.

4. The method of claim 1 further comprising the step of eliminating the internal origination flag in any data packet forwarded over an external circuit out of the local domain at the forwarding router.

5. A digital communication network for communication of data packets over circuits, said network comprising:
   a. a plurality of routers, one or more of which are organizable as a topologically continuous domain connected by circuits directly or indirectly only through such routers;
   b. at least one circuit directly connecting a router in the local domain and a router outside the local domain;
   c. means for designating circuits directly connecting any router within the local domain to any router outside said domain as external circuits;
   d. means for flagging data packets originating at any node associated with a router within the local domain with a code indicating internal origination;
   e. means for maintaining any internal origination code or lack of such code constant through communications of any data packet within the local domain; and
   f. means for forwarding on those circuits designated external only data packets having an internal origination code.

6. The digital communication network of claim 5 further comprising means for storing within a local domain router directly connected to any router outside the local domain the designations of the circuits attached to the local domain router and to a router outside the local domain as external.

7. The digital communication network of claim 5 further comprising means for deleting any data packet received over an external circuit which contains an "internal origination" flag 8. The digital communication network of claim 5 further comprising means for eliminating the internal origination flag in ay data packet forwarded over an external circuit out of the local domain at the forwarding router.

9. A router for use in a digital communication network, wherein the router is a member of a topologically continuous local domain of routers and circuits wherein each router may be connected with another router in the local domain using only circuits and routers in the local domain, said router comprising:
   a. means for recognizing whether a particular attached circuit is external in that it attaches to a router that is not a member of the local domain;
   b. means for recognizing whether a data packet to be forwarded is in that it originated from a node inside the local domain of the claimed router; and
   c. means for allowing data packets to be forwarded on non-external attached circuits, but allowing only internally originated data packets to be forwarded on external attached circuits.

10. The router of claim 9 further comprising means for storing information whether a particular attached circuit is external.

11. The router of claim 9 further comprising means for deleting any data packet received over an external circuit which contains an internal origination flag.

12. The router of claim 9 further comprising means for eliminating the internal origination flag in any data packet forwarded over an external circuit out of the local domain.

* * * * *

UNITED STATES PATENT AND TRADEMARK OFFICE
CERTIFICATE OF CORRECTION

PATENT NO. : 5,134,610
DATED : July 28, 1992
INVENTOR(S) : I. Michael C. Shand, et. al.

It is certified that error appears in the above-indentified patent and that said Letters Patent is hereby On the Title page, On the Assignees, item [73], replace "Assignees" with --Assignee--".

On the Assignees, item [73], delete "; Board of Regents of the University, Seattle, Wash.".

On the Title page, col. 2, above Abstract, line 1,
    On the Attorney, Agent, or Firm Line, delete "; Christensen, O'Connor, Johnson & Kindness".

In the Claims

In claim 1, column 8, on line 34, after "digital", insert -- communication network--.

In claim 1, column 8, on line 36, after "continuous", delete " of".

In claim 3, column 8, on line 66, replace "flag" with --or substantially similar code--.

In claim 4, column 8, on line 68, replace "flag" with --code--.

In claim 5, column 9, on line 8, after "continuous", insert -- local--.

In claim 7, column 10, on line 2, replace ""internal origination" flag" with --internal origination or substantially similar code--.

In claim 8, column 10, on line 5, replace "flag in ay" with --code in any--.

UNITED STATES PATENT AND TRADEMARK OFFICE
CERTIFICATE OF CORRECTION

PATENT NO. : 5,134,610
DATED : July 28, 1992
INVENTOR(S) : I. Michael C. Shand, et al.

It is certified that error appears in the above-indentified patent and that said Letters Patent is hereby corrected as shown below:

In claim 9, column 10, on line 18, after "is", insert -- internally originated--.

In claim 11, column 10, on line 29, replace "flag" with --or substantially similar code--.

In claim 12, column 10, line 31, replace "flag" with --status information--.

Signed and Sealed this

Nineteenth Day of July, 1994

Attest:

BRUCE LEHMAN

*Attesting Officer*    *Commissioner of Patents and Trademarks*